United States Patent
Schilling et al.

(10) Patent No.: US 10,274,069 B2
(45) Date of Patent: Apr. 30, 2019

(54) SLIP IN AXLE ASSEMBLY FOR A TANDEM AXLE ASSEMBLY

(71) Applicant: Dana Heavy Vehicle Systems Group, LLC, Maumee, OH (US)

(72) Inventors: Paulo R. Schilling, Toledo, OH (US); Ryan W. Laskey, Lambertville, MI (US); Steve G. Slesinski, Ann Arbor, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 221 days.

(21) Appl. No.: 15/143,671

(22) Filed: May 2, 2016

(65) Prior Publication Data
US 2017/0314623 A1   Nov. 2, 2017

(51) Int. Cl.
| | |
|---|---|
| *F16H 48/42* | (2012.01) |
| *F16D 3/06* | (2006.01) |
| *F16C 3/03* | (2006.01) |
| *B60K 17/346* | (2006.01) |
| *B60K 17/16* | (2006.01) |
| *B60K 17/36* | (2006.01) |
| *B60K 23/08* | (2006.01) |

(52) U.S. Cl.
CPC ............. *F16H 48/42* (2013.01); *B60K 17/16* (2013.01); *B60K 17/346* (2013.01); *B60K 17/36* (2013.01); *B60K 23/08* (2013.01); *B60K 23/0808* (2013.01); *F16C 3/03* (2013.01); *F16D 3/06* (2013.01); *B60Y 2400/421* (2013.01)

(58) Field of Classification Search
CPC ... F16H 48/42; F16C 3/03; F16D 3/06; F16D 3/18; B60K 17/22; B60K 17/24; B60K 17/36; B60K 17/346; B60K 17/34
See application file for complete search history.

(56) References Cited

U.S. PATENT DOCUMENTS

| | | | |
|---|---|---|---|
| 1,202,296 A | 10/1916 | Lessen | |
| 4,046,030 A | 9/1977 | Suzuki | |
| 4,387,605 A | 6/1983 | Grey et al. | |
| 4,721,011 A * | 1/1988 | Kubo | B60K 17/346 |
| | | | 180/248 |
| 5,711,389 A | 1/1998 | Schlosser | |
| 6,467,565 B1 * | 10/2002 | Handa | B60K 17/22 |
| | | | 180/383 |
| 6,863,634 B2 | 3/2005 | Holman et al. | |
| 7,690,449 B2 | 4/2010 | Slesinski et al. | |
| 2016/0040724 A1 * | 2/2016 | Ebihara | B60K 17/344 |
| | | | 74/11 |

* cited by examiner

*Primary Examiner* — Jacob S. Scott
*Assistant Examiner* — Lori Wu
(74) *Attorney, Agent, or Firm* — Marshall & Melhorn, LLC

(57) ABSTRACT

An input arrangement for a drive axle system and a drive axle system are provided. The input arrangement comprises a splined sleeve and an input shaft. The splined sleeve has a first end drivingly engaged with a portion of a driveshaft and a second end which defines a splined recess. The input shaft has a first splined portion on an end of the input shaft. The first splined portion is complimentary to and axially slidably engageable with the splined recess of the splined sleeve. The input arrangement for a drive axle drive system eliminates a need for a companion flange, reduces a weight of the drive axle system, and reduces noise, vibration and harshness.

19 Claims, 2 Drawing Sheets

SLIP IN AXLE ASSEMBLY FOR A TANDEM AXLE ASSEMBLY

FIELD OF THE INVENTION

The present invention relates to drive axle systems for use with vehicles having at least one drive axle.

BACKGROUND OF THE INVENTION

Vehicles incorporating multiple drive axles benefit in many ways over vehicles having a single driven axle. Drive axle systems in such vehicles may be configured to distribute torque between the axles, increasing tractive effort. The incorporation of an inter-axle differential allows the torque to be distributed between multiple axles while providing each axle operating flexibility. Power is typically applied to such drive axle systems through a Cardan shaft in driving engagement with both a transmission of the vehicle and the drive axle system.

FIG. 1 illustrates a conventional drive axle system 100. The drive axle system 100 includes an input shaft 102, an inter-axle differential 104, a differential output gear 106, an output 108, a drop gear 110, a drive pinion 112, and an axle differential assembly 114. The drive axle system 100 is in driving engagement with a vehicle transmission (not shown) through a Cardan shaft 116 and companion flange 118, which is in splining engagement with the input shaft 102. In response to rotation of the Cardan shaft 116, the companion flange 118 rotates the input shaft 102, driving the inter-axle differential 104. The inter-axle differential 104 drives both the differential output gear 106 and the output 108. The differential output gear 106 drives the axle differential assembly 114 through the drop gear 110 and the drive pinion 112 and the output 108 drives a second axle assembly (not shown).

As shown in FIG. 1, the companion flange 118 is secured to the input shaft 102 using a fastener 120, such as, but not limited to, a nut. During assembly of a vehicle drivetrain (partially shown) including the conventional drive axle system 100, the companion flange 118 is first secured to the input shaft 102. Next, a second companion flange (not shown), or a similar fitting, is secured to an output shaft of the vehicle transmission. Lastly, the Cardan shaft 116, which is configured with a slip joint 122, is coupled to both the companion flange 118 (through the use of a bearing cross 123 and bearing straps 124) and the second companion flange, completing a connection between the vehicle transmission and the conventional drive axle system 100.

While the Cardan shaft 116 allows adequate power to be transferred from the vehicle transmission to the drive axle system 100, the Cardan shaft 116 is not without its disadvantages. Incorporation of the slip joint 122, which is necessary in most applications, increases a cost and a complexity of the Cardan shaft 116. The companion flange 118 and the second companion flange, used to join the Cardan shaft 116 with the vehicle transmission and the drive axle system 100, further complicate the vehicle drivetrain. Installation of the companion flange 118 and the second companion flange prior to attachment of the Cardan shaft 116 is laborious, and therefore increases a cost of the drive axle system 100. Further, the companion flange 118 and the second companion flange are sizeable components of the vehicle drivetrain, and contribute to increased weight of and increased noise, vibration and harshness of the vehicle drivetrain.

It would be advantageous to develop an input arrangement for a drive axle system that eliminates a need for a companion flange, reduces a weight of the drive axle system, and reduces noise, vibration and harshness associated with conventional drive axle systems.

SUMMARY OF THE INVENTION

Presently provided by the invention, an input arrangement for a drive axle system that eliminates a need for a companion flange, reduces a weight of the drive axle system, and reduces noise, vibration and harshness associated with conventional drive axle systems, has surprisingly been discovered.

In one embodiment, the present invention is directed to an input arrangement for a drive axle system. The input arrangement comprises a splined sleeve and an input shaft. The splined sleeve has a first end drivingly engaged with a portion of a driveshaft and a second end which defines a splined recess. The input shaft has a first splined portion on an end of the input shaft. The first splined portion is complimentary to and axially slidably engageable with the splined recess of the splined sleeve.

In another embodiment, the present invention is directed to a drive axle system. The drive axle system comprises an axle assembly and a driveshaft. The axle assembly includes an input shaft, a drive pinion, and an axle differential arrangement. The input shaft is in driving engagement with the axle differential arrangement through the drive pinion and the input shaft. The input shaft has a first splined portion on an end of the input shaft. The driveshaft includes a splined sleeve for transferring power to the axle assembly. The splined sleeve has a first end drivingly engaged with a portion of the driveshaft and a second end defining a splined recess. The input shaft and the splined sleeve form an input arrangement in which the first splined portion of the input shaft is complimentary to and axially slidably engageable with the splined recess of the splined sleeve.

In yet another embodiment, the present invention is directed to an input arrangement for a drive axle system. The input arrangement comprises a splined sleeve, an input shaft, and a muff can seal. The splined sleeve has a first end drivingly engaged with a portion of a driveshaft and a second end defining a splined recess. The input shaft is partially disposed in a housing of the drive axle system and has a first splined portion on an end of the input shaft. The muff can seal is disposed about the input shaft and coupled to a housing the input shaft is partially disposed in. The muff can seal sealingly engages an outer surface of the splined sleeve. The first splined portion is complimentary to and axially slidably engageable with the splined recess of the splined sleeve. The splined sleeve and the input shaft form a slip joint.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 2:
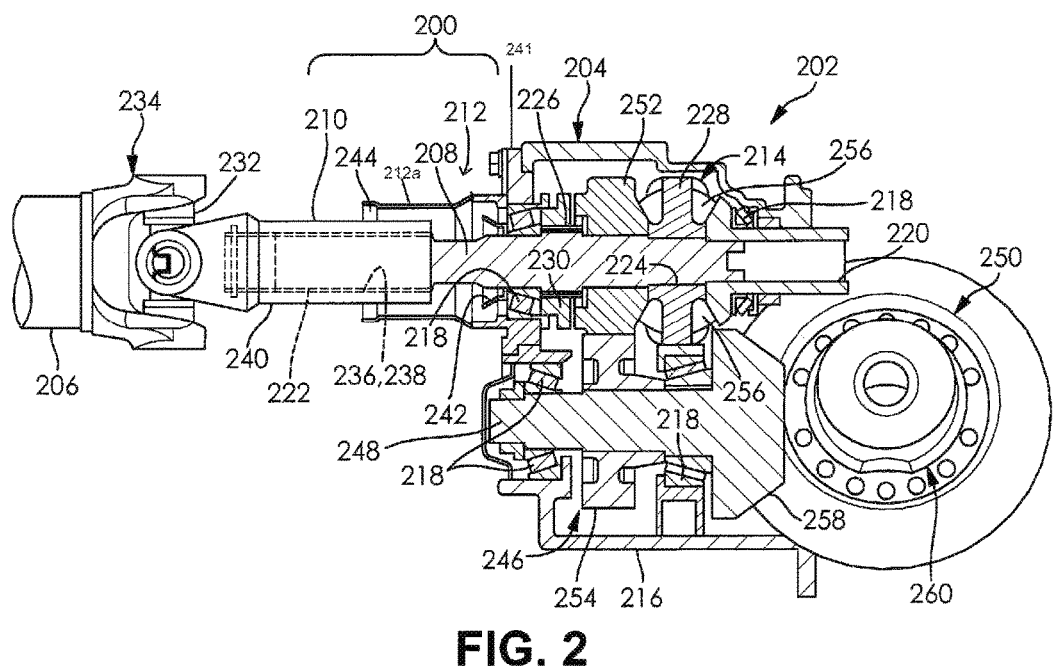
FIG. 2 is a sectional view of a drive axle system and input arrangement according to the present invention.

FIG. 2 illustrates an input arrangement 200 according to the invention. The input arrangement 200 is for use with a drive axle system 202. The drive axle system 202 comprises a first axle assembly 204 and a second axle assembly (not shown); however, it is understood that the drive axle system 202 may be configured for use with three or more axles. The first axle assembly 204 is in driving engagement with a vehicle transmission (not shown) through the input arrangement 200 and a Cardan shaft 206. The first axle assembly 204 is also in driving engagement with a second axle assembly (not shown).

The input arrangement 200 comprises an input shaft 208, a splined sleeve 210, and a muff can seal 212. The input arrangement 200 is in driving engagement with the Cardan shaft 206 and an inter-axle differential 214 of the drive axle system 202. The input arrangement 200 is a slip joint that permits the drive axle system 202 to move with respect to the vehicle transmission while facilitating power transfer therebetween.

The input shaft 208 is an elongate member partially disposed within a housing 216 of the drive axle system 202. The input shaft 208 is formed from a rigid material such as a steel, and is in driving engagement with the splined sleeve 210 and the inter-axle differential 214. The input shaft 208 is rotatably supported within the housing 216 through at least one bearing 218, components of the inter-axle differential 214, and an output 220 of the drive axle system 202. The input shaft 208 has a first splined portion 222, a second splined portion 224, and a third splined portion 226.

The first splined portion 222 is formed at a first distal end of the input shaft 208, and is located outside of the housing 216. The first splined portion 222 comprises an annular array of splines formed on an outer surface of the input shaft 208, for engaging a corresponding array of splines formed within the splined sleeve 210. The second splined portion 224 is formed at a second distal end of the input shaft 208, and is located inside of the housing 216. The second splined portion 224 comprises an annular array of splines formed on an outer surface of the input shaft 208, for engaging a corresponding array of splines formed within a spider 228 of the inter-axle differential 214. The third splined portion 226 is formed intermediate the first distal end and the second distal end of the input shaft 208, and is located inside of the housing 216. The third splined portion 226 comprises an annular array of splines formed on an outer surface of the input shaft 208, for engaging a corresponding array of splines formed within a lockup clutch 230 of the inter-axle differential 214

The splined sleeve 210 is a portion of the Cardan shaft 206. The splined sleeve 210 is a hollow, elongate member in driving engagement with a remaining portion of the Cardan shaft 206 (through a bearing cross 232 of a universal joint 234) and the first splined portion 222 of the input shaft 208. The splined sleeve 210 defines a cylindrical recess 236 having a splined inner surface 238. The splined inner surface 238 comprises an annular array of splines formed thereon for engaging the corresponding array of splines formed on the first splined portion 222 of the input shaft 208. When the input arrangement 200 is assembled, the splines of the input shaft 208 are aligned with the splines of the splined sleeve 210, and the splined sleeve 210 is disposed over the input shaft 208 and within the muff can seal 212. When the input arrangement 200 is assembled, an outer surface 240 of the splined sleeve 210 is in sliding sealing engagement with the muff can seal 212. In response to movement of the first axle assembly 204 with respect to the vehicle transmission during operation of the vehicle, the splined sleeve 210 may move along the splines of the input shaft 208, acting as a slip joint.

The muff can seal 212 is a substantially cylindrical hollow member 212a coupled to the housing 216 of the of the drive axle system 202, through the use of a housing cover 241. The housing cover 241 is removably coupled to the housing 216 with at least one threaded fastener; however, it is understood that the housing cover 241 may be coupled to the housing 216 in any conventional manner. The muff can seal 212 is concentrically disposed about a portion of the input shaft 208 extending from the housing 216. The muff can seal 212 may be rigid or flexible, is fitted to the housing cover 241 at a first end thereof, and includes a sleeve seal 244 at a second end. An input shaft seal 242 is fitted into the housing cover 241 and is disposed within the first end of the muff can seal 212 and forms a seal between an interior of the axle assembly 204 and an outer surface of the input shaft 208. The sleeve seal 244 is disposed within the second end of the muff can seal 212 and forms a seal between the muff can seal 212 and an outer surface of the splined sleeve 210. The input shaft seal 242 and the sleeve seal 244 are dynamic shaft-type seals that militate against an introduction of contaminants into the muff can seal 212 from an environment the drive axle system 202 is operated in or an egress of lubricant from within the housing 216.

The first axle assembly 204 includes the input shaft 208, a drop gear arrangement 246, the inter-axle differential 214, the lockup clutch 230, the output 220, an axle drive pinion 248, and an axle differential arrangement 250. The drop gear arrangement 246, the inter-axle differential 214, the lockup clutch 230, the axle drive pinion 248, and the axle differential arrangement 250 are disposed in the housing 216. As shown in FIG. 2, the first axle assembly 204 divides power applied to the input shaft 208 using the inter-axle differential 214. The inter-axle differential 214 is in driving engagement with both the axle differential arrangement 250 and the second axle assembly (not shown). It is understood that the first axle assembly 204 shown in FIG. 2 may be modified through the addition of features such as an axle disconnect, a clutching system that facilitates disconnection of a portion of the drive axle system 202, or a clutching system that facilitates variable engagement of a portion of the drive axle system 202.

As described hereinabove, the input shaft 208 is disposed through the housing 216. At least one bearing 218, which may be a thrust roller bearing, is in contact with the input shaft 208 to enable it to rotate within the housing 216. A portion of the input shaft 208 rotatably supports a first gear 252 of the drop gear arrangement 246 and a distal end on the input shaft 208 rotatably supports the output 220.

The drop gear arrangement 246 comprises a pair of gears drivingly engaged with one another to form a drive path between the inter-axle differential 214 and the axle drive pinion 248. The drop gear arrangement 246 comprises the first gear 252 and a second gear 254. It is understood that a diameter of the first gear 252 and the second gear 254 may be configured to adjust a drive ratio between the inter-axle differential 214 and the axle drive pinion 248. The first gear 252 and the second gear 254 are helical gears; however, it is understood other gear types may be used. As mentioned hereinabove, the first gear 252 is mounted for rotation on the input shaft 208. A first side of the first gear 252 facing the inter-axle differential 214 is configured as a side gear of the inter-axle differential 214 and a second side of the first gear 252 facing the input arrangement 200 is configured as a dog clutch for engaging the lockup clutch 230. The second gear 254, which is drivingly engaged with the first gear 252, is spliningly mounted on and drivingly engaged with the axle drive pinion 248.

The inter-axle differential 214 is a differential device rotatably disposed in the housing 216 and is in driving engagement with the input shaft 208, the output 220, and the drop gear arrangement 246. As shown in FIG. 2, the inter-axle differential 214 is a bevel gear style differential; however, it is understood that other differential types may be used. The inter-axle differential 214 comprises the spider 228, a plurality of pinion gears 256, the first gear 252, and the output 220.

The spider 228 extends radially outward from the input shaft 208. The spider 228 is part of the inter-axle differential 214 which also comprises the plurality of pinion gears 256. Each of the pinion gears 256 may be a bevel type pinion gear. At least two pinion gears 256 are rotatably disposed on the spider 256; however, it is understood that more may be used. The spider 228 extends into an aperture formed in each of the pinion gears 256.

The output 220 is disposed through the housing 216. The output 220 is in driving engagement with the pinion gears 256 and the second axle assembly (not shown), such as through a Cardan shaft (not shown), for example. An end of the output 220 disposed within the housing 216 is configured as a side gear of the inter-axle differential 214. At least one bearing 218, which may be a thrust roller bearing, is in contact with the output 220 to enable it to rotate within the housing 216. As mentioned hereinabove, the distal end on the input shaft 208 rotatably supports the output 220.

The lockup clutch 230 is an annular, dog style clutch disposed about and spliningly engaged with the third splined portion 226 of the input shaft 208. In response to movement of the lockup clutch 230 by an actuator (not shown), the lockup clutch 230 may be placed in a position where the lockup clutch 230 is drivingly engaged with the dog clutch face of the first gear 252. When the lockup clutch 230 is drivingly engaged with the dog clutch face of the first gear 252, the inter-axle differential 214 is placed in a "locked out" condition, and the first gear 252 is engaged with the input shaft 208.

The axle drive pinion 248 is rotatably disposed within the housing 216. The axle drive pinion 248 is in driving engagement with the second gear 254 and the axle differential arrangement 250. At least one bearing 218, which may be a thrust roller bearing, is in contact with the axle drive pinion 248 to enable it to rotate within the housing 216. A first end of the axle drive pinion 248 is splined to facilitate driving engagement with the second gear 254 of the drop gear arrangement 246; however, it is understood that the axle drive pinion 248 may be configured in another manner that facilitates driving engagement with the second gear 254. A second end of the axle drive pinion 248 is fitted with a spiral bevel gear 258 for rotation with the axle drive pinion 248; however, it is understood that the axle drive pinion 248 may be configured in another manner for engaging the axle differential arrangement 250.

The axle differential arrangement 250 is partially disposed within the housing 216. The axle differential arrangement 250 is in driving engagement with the axle drive pinion 248 and a pair of wheel assemblies (not shown). At least one bearing (not shown), which may be a thrust roller bearing, is in contact with a portion of the axle differential arrangement 250 to enable it to rotate within the housing 216. The axle differential arrangement 250 comprises a differential assembly 260, a first axle half shaft (not shown), and a second axle half shaft (not shown). The differential assembly 260 is a conventional differential assembly comprising a ring gear, differential housing, drive pinions, and side gears as known in the art. The side gears of the differential assembly 260 are respectively drivingly engaged with the first axle half shaft and the second axle half shaft. The ring gear of the differential assembly 260 is drivingly engaged with the spiral bevel gear 258 to facilitate driving engagement between the axle drive pinion 248 and the differential assembly 260.

Figure 3:
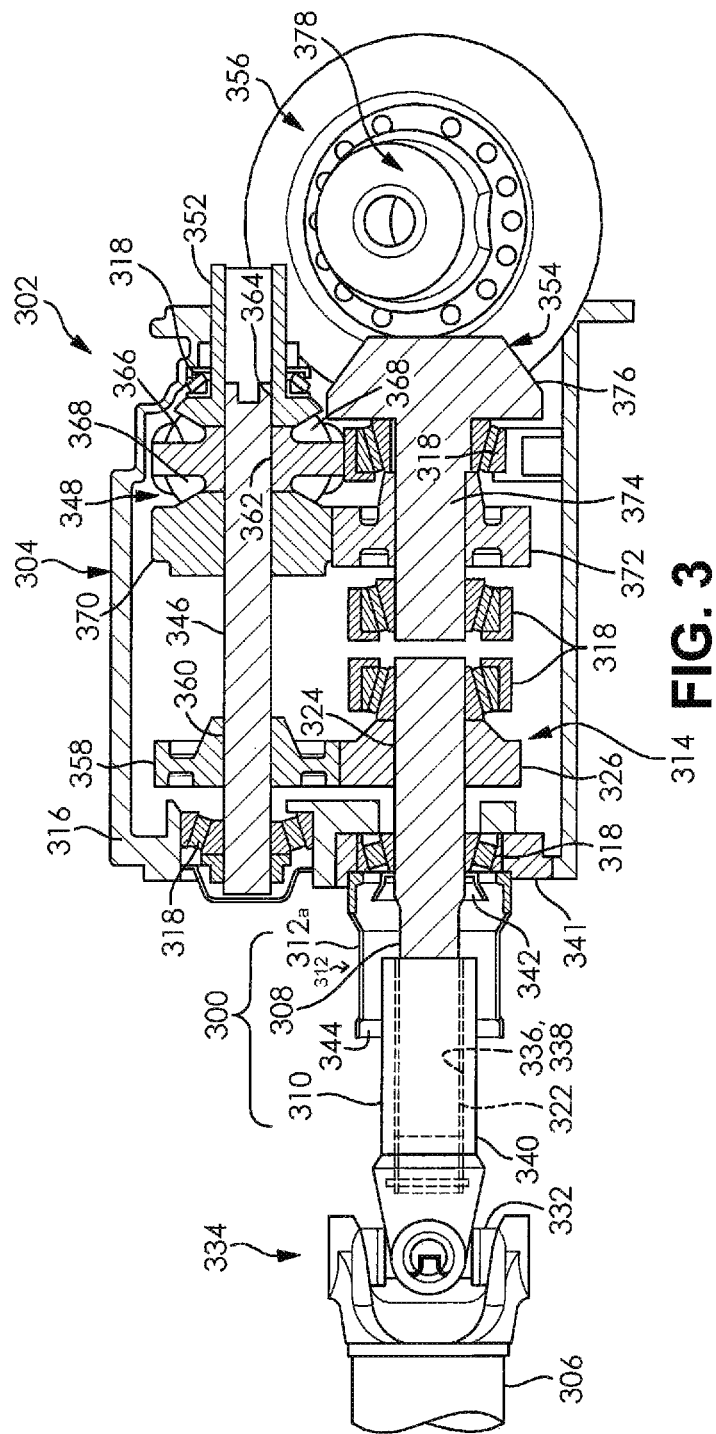
FIG. 3 is a sectional view of a drive axle system and input arrangement according to another embodiment of the present invention.

FIG. 3 illustrates an input arrangement 300 according to the invention. The input arrangement 300 is for use with a drive axle system 302. The drive axle system 302 comprises a first axle assembly 304 and a second axle assembly (not shown); however, it is understood that the drive axle system 302 may be configured for use with three or more axles. The drive axle system 302 is known as a low entry arrangement for a drive axle system. The first axle assembly 304 is in driving engagement with a vehicle transmission (not shown) through the input arrangement 300 and a Cardan shaft 306. The first axle assembly 304 is also in driving engagement with a second axle assembly (not shown).

The input arrangement 300 comprises an input shaft 308, a splined sleeve 310, and a muff can seal 312. The input arrangement 300 is in driving engagement with the Cardan shaft 306 and a drop gear arrangement 314 of the drive axle system 302. The input arrangement 300 is a slip joint that permits the drive axle system 302 to move with respect to the vehicle transmission while facilitating power transfer therebetween.

The input shaft 308 is an elongate member partially disposed within a housing 316 of the drive axle system 302. The input shaft 308 is formed from a rigid material such as a steel, and is in driving engagement with the splined sleeve 310 and the drop gear arrangement 314. The input shaft 308 is rotatably supported within the housing 316 through at least one bearing 318. The input shaft 308 has a first splined portion 322 and a second splined portion 324.

The first splined portion 322 is formed at a first distal end of the input shaft 308, and is located outside of the housing 316. The first splined portion 322 comprises an annular array of splines formed on an outer surface of the input shaft 308, for engaging a corresponding array of splines formed within the splined sleeve 310. The second splined portion 324 is formed at a second distal end of the input shaft 308, and is located inside of the housing 316. The second splined portion 324 comprises an annular array of splines formed on an outer surface of the input shaft 308, for engaging a corresponding array of splines formed within a first gear 326 of the drop gear arrangement 314.

The splined sleeve 310 is a portion of the Cardan shaft 306. The splined sleeve 310 is a hollow, elongate member in driving engagement with a remaining portion of the Cardan shaft 306 (through a bearing cross 332 of a universal joint 334) and the first splined portion 322 of the input shaft 308. The splined sleeve 310 defines a cylindrical recess 336 having a splined inner surface 338. The splined inner surface 338 comprises an annular array of splines formed thereon for engaging the corresponding array of splines formed on the first splined portion 322 of the input shaft 308. When the input arrangement 300 is assembled, the splines of the input shaft 308 are aligned with the splines of the splined sleeve 310, and the splined sleeve 310 is disposed over the input shaft 308 and within the muff can seal 312. When the input arrangement 300 is assembled, an outer surface 340 of the splined sleeve 310 is in sliding sealing engagement with the muff can seal 312. In response to movement of the first axle assembly 304 with respect to the vehicle transmission during operation of the vehicle, the splined sleeve 310 may move along the splines of the input shaft 308, acting as a slip joint.

The muff can seal 312 is a substantially cylindrical hollow member 312a coupled to the housing 316 of the of the drive axle system 302, through the use of a housing cover 341. The housing cover 341 is removably coupled to the housing 316 with at least one threaded fastener; however, it is understood that the housing cover 341 may be coupled to the housing 316 in any conventional manner. The muff can seal 312 is concentrically disposed about a portion of the input shaft 308 extending from the housing 316. The muff can seal 312 may be rigid or flexible, is fitted to the housing cover 341 at a first end thereof, and includes a sleeve seal 344 at a second end. An input shaft seal 342 is fitted to the housing cover 341 and is disposed within the first end of the muff can seal 312 and forms a seal between an interior of the axle assembly 304 and an outer surface of the input shaft 308. The sleeve seal 344 is disposed within the second end of the muff can seal 312 and forms a seal between the muff can seal 312 and an outer surface of the splined sleeve 310. The input shaft seal 342 and the sleeve seal 344 are dynamic shaft-type seals that militate against an introduction of contaminants into the muff can seal 312 from an environment the drive axle system 302 is operated in or an egress of lubricant from within the housing 316.

The first axle assembly 304 includes the input shaft 308, the drop gear arrangement 314, a counter-shaft 346, an inter-axle differential 348, an output 352, a drive pinion assembly 354, and an axle differential arrangement 356. The drop gear arrangement 314, the counter-shaft 346, the inter-axle differential 348, and the drive pinion assembly 354 are disposed in the housing 316. As shown in FIG. 3, the first axle assembly 304 divides power applied to the input shaft 308 using the inter-axle differential 348. The inter-axle differential 348 is in driving engagement with both the axle differential arrangement 356 and the second axle assembly, through the output 352. It is understood that the first axle assembly 304 shown in FIG. 3 may be modified through the addition of features such as an axle disconnect, a clutching system that facilitates disconnection of a portion of the drive axle system 302, or a clutching system that facilitates variable engagement of a portion of the drive axle system 302.

As described hereinabove, the input shaft 308 is disposed through the housing 316. At least one bearing 318, which may be a thrust roller bearing, is in contact with the input shaft 308 to enable it to rotate within the housing 316. A portion of the input shaft 308 rotatably supports the first gear 326 of the drop gear arrangement 314.

The drop gear arrangement 314 comprises a pair of gears drivingly engaged with one another to form a drive path between the input shaft 308 and the counter-shaft 346. The drop gear arrangement 314 comprises the first gear 326 and a second gear 358. It is understood that a diameter of the first gear 326 and the second gear 358 may be configured to adjust a drive ratio between the input shaft 308 and the counter-shaft 346. The first gear 326 and the second gear 358 are helical gears; however, it is understood other gear types may be used. As mentioned hereinabove, the first gear 326 is mounted for rotation on the input shaft 308. The second gear 358, which is drivingly engaged with the first gear 326, is splningly mounted on and drivingly engaged with the counter-shaft 346.

The counter-shaft 346 is an elongate member disposed within the housing 316 of the drive axle system 302. The counter-shaft 346 is formed from a rigid material such as a steel, and is in driving engagement with the second gear 358 and the inter-axle differential 348. The counter-shaft 346 is rotatably supported within the housing 316 through at least one bearing 318, components of the inter-axle differential 348, and the output 352 of the drive axle system 302. The counter-shaft 346 has a first splined portion 360, a second splined portion 362, and a journal portion 364.

The first splined portion 360 is formed at a first distal end of the counter-shaft 346. The first splined portion 360 comprises an annular array of splines formed on an outer surface of the counter-shaft 346, for engaging a corresponding array of splines formed within the second gear 358. The second splined portion 362 is formed adjacent a second distal end of the counter-shaft 346. The second splined portion 362 comprises an annular array of splines formed on an outer surface of the counter-shaft 346, for engaging a corresponding array of splines formed within a spider 366 of the inter-axle differential 348. The journal portion 364 comprises the second distal end of the counter-shaft 346 and is rotatably disposed within the output 352. It is understood that a bearing (not shown) may be disposed between the journal portion 364 and an inner surface of the output 352. At least one bearing 318, which may be a thrust roller bearing, is in contact with the counter-shaft 346 to enable it to rotate within the housing 316. A portion of the counter-shaft 346 rotatably supports the inter-axle differential 348 and the second distal end on the counter-shaft 346 rotatably supports the output 35.

The inter-axle differential 348 is a differential device rotatably disposed in the housing 316 and is in driving engagement with the counter-shaft 346, the output 352, and the drive pinion assembly 354. As shown in FIG. 3, the inter-axle differential 348 is a bevel gear style differential; however, it is understood that other differential types may be used. The inter-axle differential 348 comprises the spider 366, a plurality of pinion gears 368, an output gear 370, and the output 352.

The spider 366 extends radially outward from the output 352. The spider 366 is part of the inter-axle differential 348 which also comprises the plurality of pinion gears 368. Each of the pinion gears 368 may be a bevel type pinion gear. At least two pinion gears 368 are rotatably disposed on the spider 366; however, it is understood that more may be used. The spider 366 extends into an aperture formed in each of the pinion gears 368.

The output gear 370 is mounted for rotation on the counter-shaft 346. A side of the output gear 370 facing the inter-axle differential 348 is configured as a side gear of the inter-axle differential 348. An outer surface of the output gear 370 is in driving engagement with the drive pinion assembly 354.

The output 352 is disposed through the housing 316. The output 352 is in driving engagement with the pinion gears 368 and the second axle assembly (not shown), such as through a Cardan shaft (not shown), for example. An end of the output 352 disposed within the housing 316 is configured as a side gear of the inter-axle differential 348. At least one bearing 318, which may be a thrust roller bearing, is in contact with the output 352 to enable it to rotate within the housing 316. As mentioned hereinabove, the distal end on the counter-shaft 346 rotatably supports the output 352.

The drive pinion assembly 354 is rotatably disposed within the housing 316. The drive pinion assembly 354 comprises a pinion drive gear 372 and a drive pinion 374. The pinion drive gear 372 is disposed about and spliningly engaged with a portion of the drive pinion 374. The pinion drive gear 372 is drivingly engaged with the output gear 370. It is understood that a diameter of the output gear 370 and the pinion drive gear 372 may be configured to adjust a drive ratio between the output gear 370 and the drive pinion 374. The output gear 370 and the pinion drive gear 372 are helical gears; however, it is understood other gear types may be used.

The drive pinion 374 is in driving engagement with the pinion drive gear 372 and the axle differential arrangement 356. At least one bearing 318, which may be a thrust roller bearing, is in contact with the drive pinion 374 to enable it to rotate within the housing 316. A first end of the drive pinion 374 is splined to facilitate driving engagement with the pinion drive gear 372; however, it is understood that the drive pinion 374 may be configured in another manner that facilitates driving engagement with the pinion drive gear 372. A second end of the drive pinion 374 is fitted with a spiral bevel gear 376 for rotation with the drive pinion 374; however, it is understood that the drive pinion 374 may be configured in another manner for engaging the axle differential arrangement 356.

The axle differential arrangement 356 is partially disposed within the housing 316. The axle differential arrangement 356 is in driving engagement with the drive pinion 374 and a pair of wheel assemblies (not shown). At least one bearing (not shown), which may be a thrust roller bearing, is in contact with a portion of the axle differential arrangement 356 to enable it to rotate within the housing 316. The axle differential arrangement 356 comprises a differential assembly 378, a first axle half shaft (not shown), and a second axle half shaft (not shown). The differential assembly 378 is a conventional differential assembly comprising a ring gear, differential housing, drive pinions, and side gears as known in the art. The side gears of the differential assembly 378 are respectively drivingly engaged with the first axle half shaft and the second axle half shaft. The ring gear of the differential assembly 378 is drivingly engaged with the spiral bevel gear 376 to facilitate driving engagement between the drive pinion 374 and the differential assembly 378.

In use, the input arrangement 200, 300 for use with the drive axle system 202, 302 eliminates a need for a companion flange used in the prior art, reduces a weight of the drive axle system 202, 302, and reduces noise, vibration and harshness associated with operation of the drive axle system 202, 302.

As mentioned hereinabove, installation of the companion flange used in the prior art is laborious, and therefore increases a cost of a drive axle system the companion flange is incorporated in. Further, the companion flange used in the prior art is a sizeable component of the vehicle drivetrain, and contributes to increased weight of and increased noise, vibration and harshness of the vehicle drivetrain. The input arrangement 200, 300 eliminates the companion flange, and therefore reduces a weight of the drive axle system 202, 302. Due to a size and weight of the companion flange used in the prior art, the companion flange contributes to increased noise, vibration and harshness of the vehicle drivetrain, by adversely affecting operating characteristics of the vehicle drivetrain. By eliminating the companion flange, the input arrangement 200, 300 reduces residual unbalance, resulting in decreased noise, vibration and harshness of the drive axle system 202, 302.

Further, by eliminating a need for the companion flange used in the prior art, the input arrangement 200, 300 simplifies assembly of the drive axle system 202, 302, and therefore reduces labor required to assemble the drive axle system 202, 302.

Figure 1:
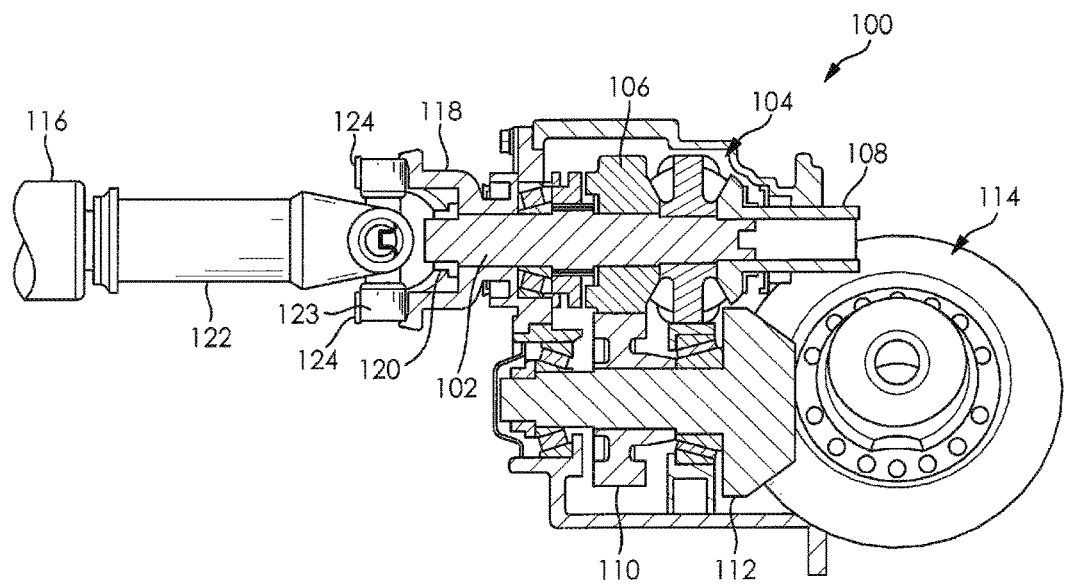
FIG. 1 is a sectional view of a conventional drive axle system and Cardan shaft as known in the art.

The assembly of the conventional drive axle system 100 illustrated in FIG. 1 requires the use of the companion flange 118 and the fastener 120. Precise torque control of the fastener 120 must be implemented for proper assembly of the drive axle system 100. The input arrangement 200, 300 of the drive axle system 202, 302 according to the present invention eliminates a need for the companion flange 118 and the fastener 120, and thus a need for a precise torque control over the fastener 120.

Assembly of the drive axle system 202, 302 is further simplified through the elimination of the bearing straps 124 used on the conventional drive axle system 1000. Assembly of the drive axle system 202, 302 is performed by simply sliding the splined sleeve 210, 310 over the splined portion 222, 322 of the input shaft 208, 308. The sleeve seal 244, 344 protects the input arrangement 200, 300 from outside contamination.

The input shaft seal 242, 342 prevents contamination of a lubricating oil used in the drive axle system 202, 302 by militating against a migration of contaminants into the housing 216, 316 along the input shaft 208, 308. Similarly, the input shaft seal 242, 342 militates against an egress of the lubricating oil from the drive axle system 202, 302.

Through the use of the input shaft 208, 308 and the splined sleeve 210, 310, a connection capable of transmitting power from the Cardan shaft 206, 306 to the first axle assembly 204, 304 and the second axle assembly while also providing the functionality of a slip joint is formed. The splined sleeve 210, 310, and thus the Cardan shaft 206, 306, is free to move axially with respect to the input shaft 208, 308 and the muff can seal 212, 312.

In accordance with the provisions of the patent statutes, the present invention has been described in what is considered to represent its preferred embodiments, however, it should be noted that the invention can be practiced otherwise than as specifically illustrated and described without departing from its scope or spirit.

What is claimed is:

1. An input arrangement for a drive axle system, comprising:
   a splined sleeve having a first end drivingly engaged with a portion of a driveshaft and a second end defining a splined recess;
   an input shaft having a first splined portion on an end of the input shaft, a second splined portion at a remaining end of the input shaft and a third splined portion formed intermediate the first splined portion and the second splined portion, wherein the first splined portion is complimentary to and axially slidably engageable with the splined recess of the splined sleeve; and a muff can seal disposed about the input shaft for sealingly engaging an outer surface of the splined sleeve.

2. The input arrangement according to claim 1, wherein the muff can seal is coupled to a housing the input shaft is partially disposed in.

3. The input arrangement according to claim 1, wherein the splined recess and the first splined portion each comprise an annular array of splines.

4. The input arrangement according to claim 1, wherein the driveshaft drivingly engaged with the splined sleeve is a Cardan shaft.

5. The input arrangement according to claim 1, wherein the splined sleeve and the input shaft form a slip joint.

6. The input arrangement according to claim 1, further comprising an input shaft seal fitted into a housing cover of the axle assembly, the input shaft seal forming a seal between the axle assembly and the input shaft.

7. The input arrangement according to claim 1, wherein the muff can seal comprises a sleeve seal at an end thereof for forming a seal between the muff can seal and an outer surface of the splined sleeve.

8. A drive axle system, comprising:

an axle assembly having an input shaft, a drive pinion, and an axle differential arrangement, the input shaft in driving engagement with the axle differential arrangement through the drive pinion and the input shaft having a first splined portion on an end of the input shaft, a second splined portion at a remaining end of the input shaft and a third splined portion formed intermediate the first splined portion and the second splined portion;

a driveshaft including a splined sleeve for transferring power to the axle assembly, the splined sleeve having a first end drivingly engaged with a portion of the driveshaft and a second end defining a splined recess; and a muff can seal disposed about the input shaft for sealingly engaging an outer surface of the splined sleeve, wherein the input shaft and the splined sleeve form an input arrangement in which the first splined portion of the input shaft is complimentary to and axially slidably engageable with the splined recess of the splined sleeve.

9. The drive axle system according to claim 8, wherein the muff can seal is coupled to a housing the input shaft is partially disposed in.

10. The drive axle system according to claim 8, wherein the splined recess and the first splined portion each comprise an annular array of splines.

11. The drive axle system according to claim 8, wherein the driveshaft drivingly engaged with the splined sleeve is a Cardan shaft.

12. The drive axle system according to claim 8, wherein the splined sleeve and the input shaft form a slip joint.

13. The drive axle system according to claim 8, further comprising an input shaft seal fitted into a housing cover of the axle assembly, the input shaft seal forming a seal between the axle assembly and the input shaft.

14. The drive axle system according to claim 8, wherein the muff can seal comprises a sleeve seal at an end thereof for forming a seal between the muff can seal and an outer surface of the splined sleeve.

15. The input arrangement according to claim 8, wherein the axle differential arrangement comprises a spider with an array of splines formed within, wherein the second splined portion comprises an annular array of splines formed on an outer surface of the input shaft, and wherein the array of splines of the second splined portion engage the array of splines formed within the spider.

16. The input arrangement according to claim 8, wherein the axle differential arrangement comprises a lockup clutch with an array of splines formed within, wherein the third splined portion comprises an annular array of splines formed on an outer surface of the input shaft, and wherein the array of splines of the third portion engage the array of splines formed within the lockup clutch.

17. The input arrangement according to claim 8, further comprising a drop gear arrangement having a first gear rotatably supported on the input shaft, wherein the third splined portion comprises an annular array of splines formed on an outer surface of the input shaft, and wherein the array of splines of the third splined portion engage an array of splines formed within the first gear.

18. An input arrangement for a drive axle system, comprising:

a splined sleeve having a first end drivingly engaged with a portion of a driveshaft and a second end defining a splined recess;

an input shaft partially disposed in a housing of the drive axle system having a first splined portion on an end of the input shaft and a second splined portion at a remaining end of the input shaft; and a muff can seal disposed about the input shaft and coupled to a housing the input shaft is partially disposed in, the muff can seal for sealingly engaging an outer surface of the splined sleeve, wherein the first splined portion is complimentary to and axially slidably engageable with the splined recess of the splined sleeve and the splined sleeve and the input shaft form a slip joint.

19. The input arrangement according to claim 18, further comprising an input shaft seal fitted to a housing cover, the input shaft seal disposed within an end of the muff can seal, the input shaft seal forming a seal between an interior of the axle assembly and an outer surface of the input shaft.

* * * * *